UNITED STATES PATENT OFFICE.

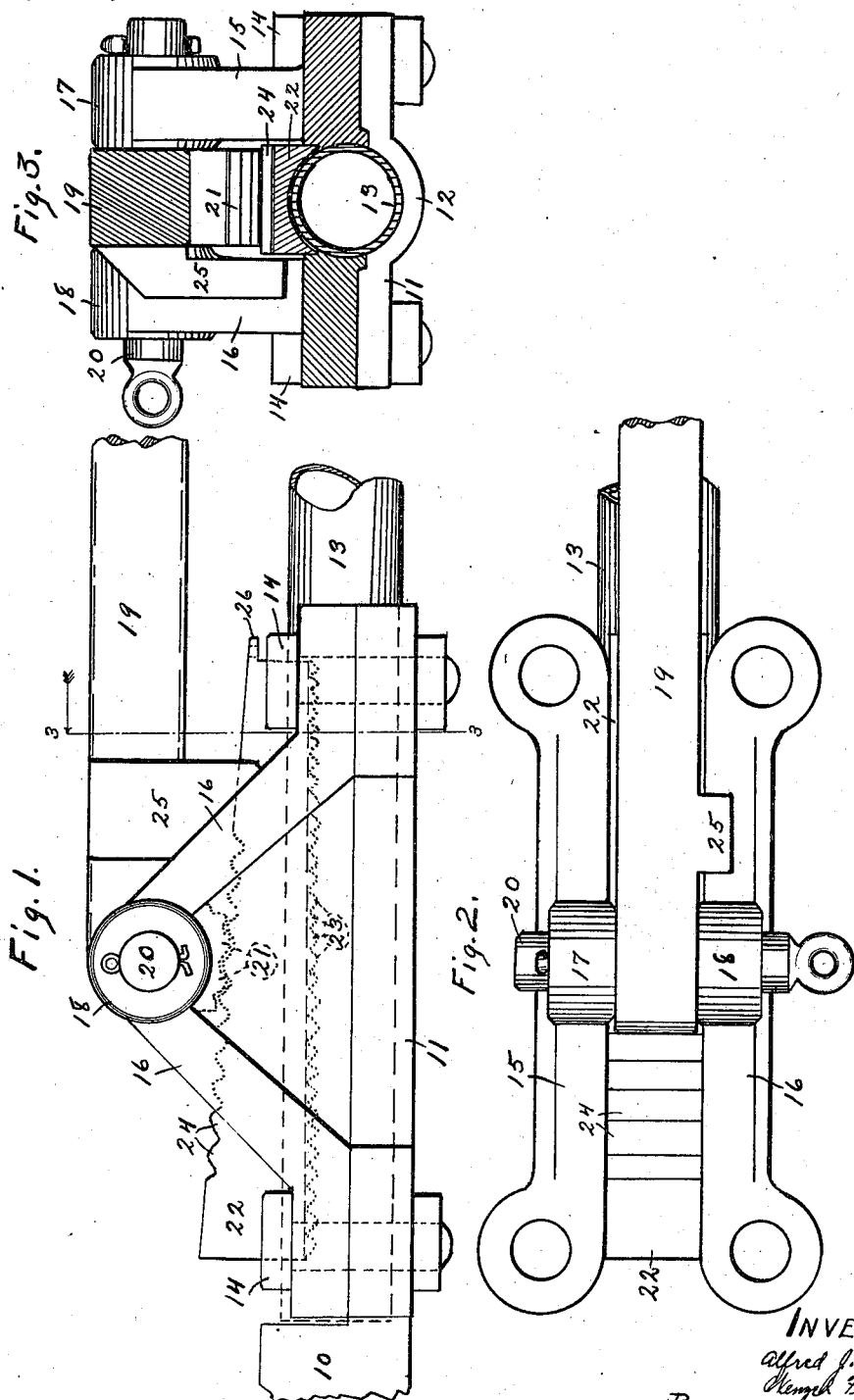

ALFRED J. CLEMENTS AND WENZEL FISCHER, OF DES MOINES, IOWA.

TROLLEY-POLE CLAMP.

1,300,929.

Specification of Letters Patent.   Patented Apr. 15, 1919.

Application filed April 16, 1917.   Serial No. 162,579.

*To all whom it may concern:*

Be it known that we, ALFRED J. CLEMENTS and WENZEL FISCHER, citizens of the United States, residing in Des Moines, county of Polk, and State of Iowa, have invented a new and useful Improvement in Trolley-Pole Clamps, of which the following is a specification.

The object of this invention is to provide improved means for detachably connecting a trolley pole to the base.

A further object of this invention is to provide improved means for readily removing and replacing a trolley pole relative to its seat in the base.

Our invention consists in the construction, arrangement and combination of elements hereinafter set forth, pointed out in our claims and illustrated by the accompanying drawing, in which—

Figure 1 is a side elevation showing a trolley pole and base, in part, equipped with our improved attaching means, dotted lines indicating construction of hidden parts.

Fig. 2 is a plan of the same, the clamping bolts being removed. Fig. 3 is a vertical section on the line 3—3 of Fig. 1.

In the construction of the device as shown the numeral 10 designates generally a trolley pole base, a portion only of which is shown, which may be of any suitable construction, and is adapted to be pivoted to the top of a trolley car in a common manner. The base 10 is formed with an integral, rearwardly extending lower clamping member 11, which clamping member is formed with a central, longitudinally extending, concaved seat 12 adapted to coact with other members in forming a mounting for the lower portion of a trolley pole such as 13. In common practice the trolley pole 13 is clamped to the clamping member 11 by bolts 14 passing through corner portions of said clamping member and a similar clamping member mounted above the trolley pole, and to remove or replace said trolley pole it is necessary to loosen all of said bolts, which are commonly four in number. It is our purpose and design to expedite the removal and replacing of the trolley poles by providing an eccentric, lever-operated latching mechanism for securing the trolley pole to the clamping member 11 of the base.

Brackets 15, 16 are mounted on opposite sides of and secured to the clamping member 11 by means of the bolts 14, said brackets replacing the coacting clamping member commonly used, above referred to. The brackets 15, 16 rise a considerable distance above the clamping plate 11 and are formed with bearings 17, 18, respectively, in their central upper portions. A lever 19 is fulcrumed at one end to and between the brackets 15, 16, by means of a pin or bolt 20 seated in the bearings 17, 18. The lever 19 is formed with a laterally projecting cam face 21 which is eccentric to the fulcrum 20 and is toothed, as shown by dotted lines in Fig. 1. A wedge 22 is separately formed and is concaved on its lower face to engage and fit the trolley pole 13, and said concaved face is transversely toothed to provide a gripping engagement with said pole, said teeth being indicated by the numeral 23 and shown in dotted lines in Fig. 1. On its upper face the wedge 22 is formed with transversely extending teeth 24, adapted to be engaged by the teeth of the cam face 21 of the latch.

In practical use, the parts being disassembled, the lever 19 is moved to vertical position and the trolley pole 13 is inserted in the seat 12 of the lower clamping plate. The wedge 22 is then laid upon the lower portion of the pole 13 with its thicker portion toward the base 10, and the lever 19 is moved downwardly manually to bring the toothed cam face 21 into engagement and mesh with the teeth 24 of said wedge. Continued downward movement of the free end of the lever 19 causes the wedge to be forced rearwardly on the pole 13 and to frictionally engage said pole and hold it to its seat. Attention is called to the fact that the projecting cam face 21 compensates for the decreased thickness of the wedge 22 as said wedge is forced rearwardly, so that pressure is not increased as the wedge is forced to its ultimate position; it being understood that care must be taken in the manual placing of the wedge before engagement by said cam face, to correspond to the diameter of the trolley pole. Because of the decreasing thickness of the wedge as it goes to its place, and the increasing projection of the cam face, it follows that the same amount of force is required to withdraw said wedge as to force it to place, thereby tending to prevent accidental withdrawal of the wedge and disconnection of the parts. A stop 25 is formed on and projects laterally and downwardly from the lever 19 and is adapted to engage the bracket 16 to limit downward movement of the lever, its lowermost position being approximately parallel with the pole 13.

The wedge 22 preferably is formed with an apertured projecting lip 26 on one end adapted to be connected, as by a chain (not shown) to the apertured head of the bolt 20, to prevent loss or displacement of said wedge when not in position.

We claim as our invention—

1. In a clamp for trolley poles and the like, a base formed with a seat, spaced brackets connected to the base and extending upwardly therefrom on opposite sides of the seat, a lever pivoted to the brackets and mounted between the latter, a toothed cam carried by the lever, a wedge having a seat complementary to the seat of the base and having teeth engageable with the teeth of the cam, and a stop carried by the lever and extending outwardly from a side thereof and engageable with one of the brackets to restrict movement of the lever to clamping position.

2. In a clamp for trolley poles and the like, a base having a lower clamping member formed with a central seat, spaced brackets on opposite sides of the base having feet seating on top of the base and bolted thereto, a lever pivoted to and between the brackets, a toothed cam borne by the lever, a wedge slidable between the brackets and having a seat complementary to the seat of the base and having teeth engageable with the teeth of the cam, and a stop on the lever to restrict movement thereof to clamping position.

3. In a clamp for trolley poles and the like, a lower clamping member, an upper slidable clamping member having a series of teeth on its upper face arranged in an inclined plane, a pivoted lever, and a cam borne by the lever and having teeth to engage the teeth of the upper member whereby to slide the latter rearwardly upon downward movement of the lever, the cam being formed to force the upper member toward the lower member to clamp the pole upon said downward movement of the lever.

ALFRED J. CLEMENTS.
WENZEL FISCHER.

Copies of this patent may be obtained for five cents each, by addressing the "Commissioner of Patents, Washington, D. C."